United States Patent [19]

Sizer et al.

[11] 4,258,794
[45] Mar. 31, 1981

[54] UNDERWATER COMPLETION HABITAT

[75] Inventors: Phillip S. Sizer; Joseph L. Pearce, both of Dallas, Tex.; Sanford R. Dowden, Slidell, La.

[73] Assignee: Otis Engineering Corporation, Dallas, Tex.

[21] Appl. No.: 38,541

[22] Filed: May 14, 1979

[51] Int. Cl.³ .......................................... E21B 43/013
[52] U.S. Cl. .................................. 166/356; 166/347; 166/352; 405/169; 405/193
[58] Field of Search ............... 166/351, 352, 347, 357, 166/359, 356; 175/5; 405/169, 193

[56] References Cited

U.S. PATENT DOCUMENTS

| | | | |
|---|---|---|---|
| 3,211,223 | 10/1965 | Hoch | 166/356 |
| 3,421,579 | 1/1969 | Manning | 166/356 |
| 3,482,410 | 12/1969 | Roesky et al. | 405/169 |
| 3,527,294 | 9/1970 | Weiss et al. | 166/356 |
| 3,853,183 | 12/1974 | Downs | 166/356 X |
| 3,924,616 | 12/1975 | Banjavich | 405/193 X |

Primary Examiner—James A. Leppink
Assistant Examiner—Richard E. Favreau
Attorney, Agent, or Firm—Vinson & Elkins

[57] ABSTRACT

A submergible, underwater well completion habitat and a method of employing the same in the completion of wells at extended depths. The well completion habitat may be attached to an underwater well platform and maintained at a pressure of sufficient value to expel water from the work chamber and also to maintain it substantially water free so that one or more saturated divers may work within the chamber to complete the well. This abstract of the invention is neither intended to define the scope of the invention, which, of course, is measured by the claims, nor is it intended to limit the invention in any way.

6 Claims, 6 Drawing Figures

UNDERWATER COMPLETION HABITAT

BACKGROUND OF THE INVENTION

1. Field of the Invention

The present invention relates to a submergible, underwater well completion habitat and a method of employing the same in the completion of wells at extended depths. More particularly, the invention refers to a well completion habitat which may be attached to an underwater well platform and maintained at a pressure of sufficient value to expel sea water from the work chamber and also to maintain it substantially water free so that one or more saturated divers may work within the habitat to complete the well.

2. The Prior Art

Methods for completing oil and gas wells at depths greater than 200 feet have been the subject of much research and development for many years. Remote control devices have been developed which may be operated from specially equipped ships and barges. However, these systems are complicated and require precise control of automatic devices that may be resting on or near the ocean floor many hundreds of feet below their control vessel.

To avoid the use of remote control devices, much effort has been invested in perfecting underwater work apparatus that permit oilfield specialists to work in a one atmosphere environment. A subsea structure or chamber has been provided that will permit normal breathing and which is sealed from the surrounding ocean. Such a structure is described and claimed in U.S. Pat. No. 3,656,549 to Holbert et al.

In all of these subsea work chambers, there are two requirements which must be met. First, the chamber must be capable of withstanding full hydrostatic pressure of the sea water acting on its exterior while only one atmosphere of pressure acts on its interior. Second, an effective seal must be provided to close the chamber and this seal, like the walls of the chamber, is subjected to the differential pressure which exists between the exterior and the interior of the chamber.

Justification for such one atmosphere subsea chambers is based upon a desire to utilize "oil field" trained workers at the well head, as opposed to "divers" who normally work at these depths but who are not normally trained in oilfield practices. Disadvantages to divers working underwater are their positive buoyancy, restricted maneuverability and visual limitations caused by lack of light and by light blocking or reflecting particles suspended in their water environment.

There are many patents illustrating apparatus which provide an air tight, water-free work environment at an underwater well structure. One of the most recent is U.S. Pat. No. 4,004,635 to R.A.M. Marquarie et al., which describes a bell housing assembly for connecting inflexible pipe onto a well head. However, this chamber, too, is water tight and is designed for one atmosphere operation.

U.S. Pat. No. 3,513,910, to Robert D. Townsend, describes a subsea production satellite having the requirement of a water free chamber capable of sustaining a one atmosphere environment while withstanding the hydrostatic forces surrounding the vessel.

It is an object of this invention to provide an underwater well completion system that will allow one or more saturated divers to complete an underwater well while working in a water free environment.

It is a further object to provide an underwater well completion habitat that can be lowered from the surface of the ocean and attached to an underwater well structure or otherwise disposed in proper position.

It is a still further object of this invention to provide an underwater well completion habitat that can be attached to an underwater well structure in which pressure is of sufficient value to expel water therefrom and also to maintain the chamber substantially water free.

It is another object of this invention to provide an underwater well completion habitat, which when attached to an underwater well structure, provides a water free work environment and a breathable atmosphere therein.

Another object of this invention is to provide an underwater well completion habitat that does not have to withstand the full hydrostatic pressure of the water exterior thereof with only atmosphere pressure therein.

An additional object of this invention is to provide an underwater well completion habitat constructed of materials which will withstand impinging water current forces, when in a fixed position in a body of water.

Another object of this invention is to provide an underwater well completion habitat whose internal pressure when disposed below the surface will be substantially equal to the hydrostatic pressure of the surrounding water.

A still further object is to provide an underwater well completion habitat wherein saturated divers may complete and test an underwater well with equipment, pumps, flow lines and the like which have been carried to the well structure within and attached to the completion habitat.

SUMMARY OF THE INVENTION

According to one aspect of the present invention there is provided an underwater well completion system comprising: an independently transportable chamber, having a lower open section, capable of being transported to a region above the well, lowered from the surface, and adapted to rest upon an underwater well structure; means for securing said chamber to said well structure in a non-sealing relation; means on said chamber communicating with the surface for evacuating sea water from the inside of said chamber and for maintaining a pressurized breathing atmosphere within said chamber; said chamber being constructed of materials which would only be required to withstand impinging forces of water currents and a very small differential pressure substantially equal to the internal height of the chamber times the maximum water pressure gradient (approximately 0.5 psi/foot, or 0.1153 kg./sq. cm./m.).

In addition, there may be provided within said chamber, such items as tools, valves, manifolds and the like for completing said well, which items are preferably secured therein for reasons of safety. There is also provided on the chamber means for securing flow lines and associated equipment.

The invention will be more fully understood from the following description of an embodiment thereof, given by way of example only, with reference to the accompanying drawings.

IN THE DRAWINGS

DESCRIPTION OF THE PREFERRED EMBODIMENT

Figure 1:
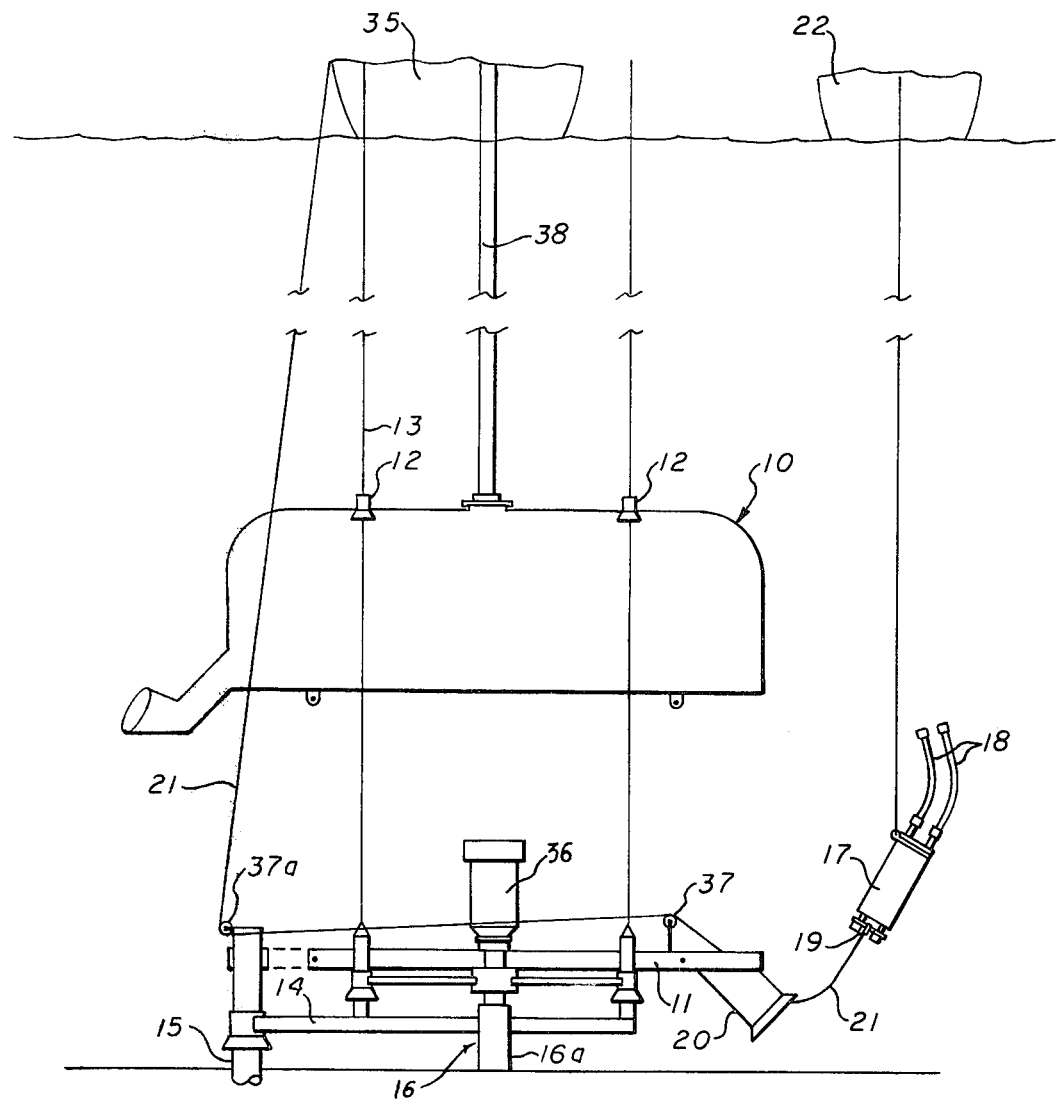
FIG. 1 is a diagrammatic plan, cross-sectional view of the underwater work habitat being lowered from a drilling platform to the well structure.

In the drawings, FIG. 1 is representative of an underwater well installation on the ocean floor. For the purposes of this invention, it is not critical how the well was drilled. That is to say, the well may be drilled by floating, semi-submergible or jack-up drilling rigs. Typically, a platform 11 is connected to the well casing system 16. This platform 11 is a part of the well's guide system and will provide a work base for divers during later stages of the well completion.

Following drilling of the well, the well tubing would be landed in the tubing hanger (not shown) on the well casing system 16 and plugged. Surfaced controlled, subsurface safety valves would be closed and back pressure valves may be installed in the tubing hanger, if desired.

Once the well has been secured, the blowout preventer (BOP) stack 36 is removed by releasing a hydraulic latch (not shown) either remotely or by using a diving bell and divers which are a part of the drilling rig 35 ancillary services. FIG. 1 shows the work habitat 10, of the invention, being lowered from the drilling rig 35 using a running tool 38 and assisted by the guide system 13 of the well. While FIG. 1 shows the BOP stack 36 still connected to the well, in practice, this would be removed prior to the lowering of the habitat 10.

The well system 16 of FIG. 1 depicts a pin pile 14 supported upon a casing 16a and pile support 15, which arrangement provides for moment forces to be applied to the support member 15 rather than the casing 16a.

The platform 11 would preferably have a receptacle or flow line funnel 20, at one end of the platform 11, for supporting and connecting a flow line bundle. Probably before the habitat 10 is lowered to the well system 16, a flow line nose 17, with control lines 18, is lowered from a support vessel 22, and pulled into place, oriented and locked into the platform 11 flow line funnel 20. A variety of means can be provided for pulling the flow line nose 17 into receptacle 20, such as the cable 21 and pully arrangement 37 and 37a shown in FIG. 1.

The habitat 10 is lowered, as described above, and is secured by suitable connectors, latches or other means 10a. It is significant, however, that the habitat 10 is not connected to the platform 11 or well structure 16 in a sealing configuration. Rather, the platform 11 is preferably a metal grating that allows movement of fluid therethrough.

Figure 2:
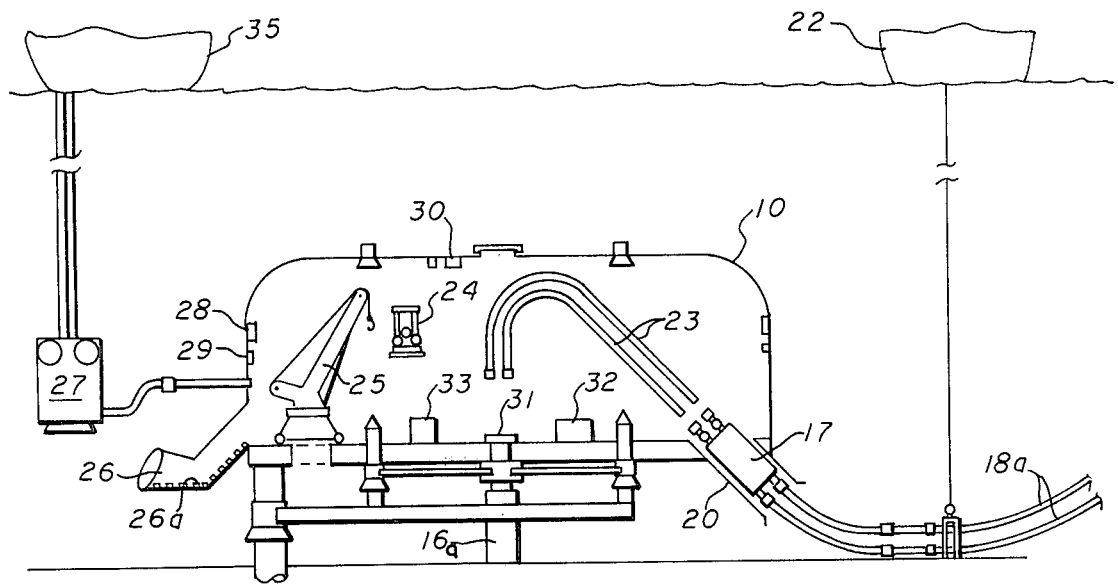
FIG. 2 is a diagrammatic plan, cross-sectional view of the underwater well completion system, with representative equipment connected therein, with a rig diving bell lowered from a surface structure.
Figure 3:
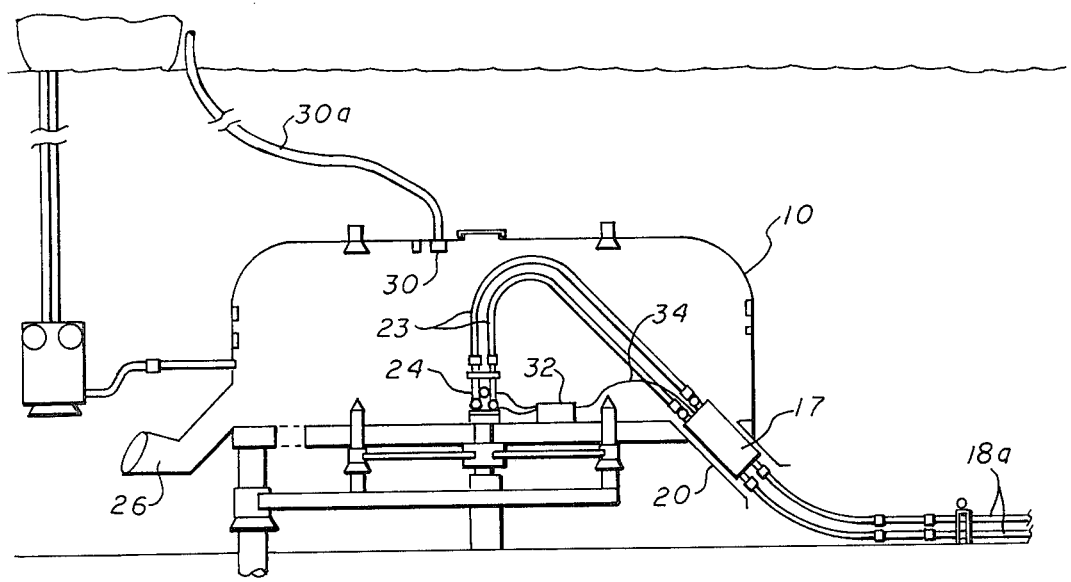
FIG. 3 is a diagrammatic plan, cross-sectional view of the underwater well completion system, showing the flow lines connected to the well and the well being rigged for testing.
Figure 5:
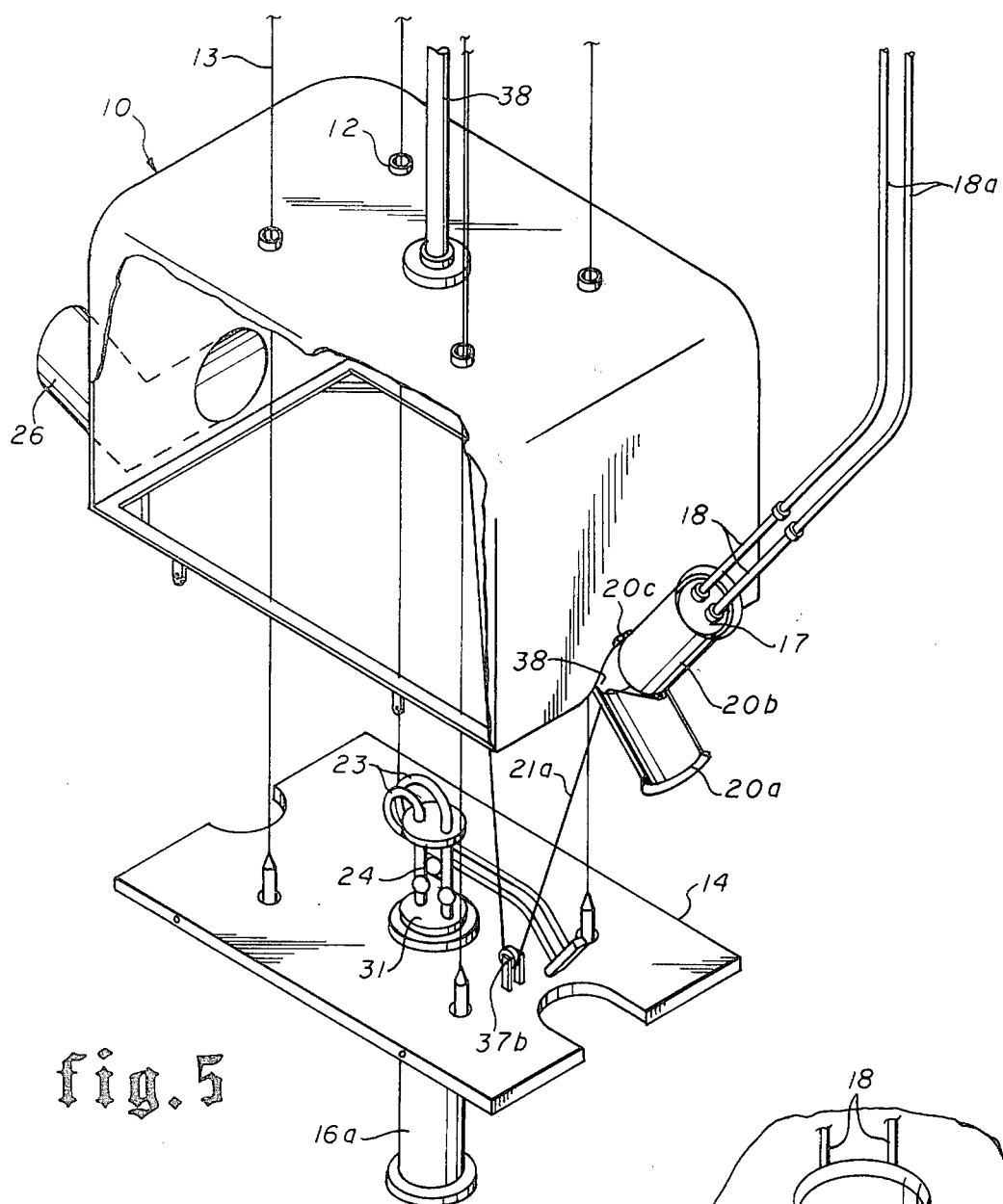
FIG. 5 is a perspective view, partially cut-away, of the underwater well completion system, as illustrated in FIG. 4.

FIG. 5 shows the platform 11 in place on the well system 16 prior to lowering the habitat 10. In some instances, however, it may be desirable to lower platform 11 and habitat 10 as a unitary structure, with well completion tools secured therein, as illustrated in FIG. 2.

The habitat 10 is sometimes referred to hereinafter as "chamber", to reflect the fact that the internal work space of the habitat provides protection, for the divers, from ocean currents. Also, when the water is pumped from the habitat 10, a water free work space is provided. FIG. 2 also illustrates a lay barge or ship 22 being used in conjunction with the drilling structure 35, whereby the flow lines 18a may be laid by means of a cable 23, or other suitable means used for this purpose. Methods for laying flow lines are well known in the art.

Thus, as the well is being completed, the chamber 10 is lowered while the flow lines 18a are being pulled toward the well system 16. After the chamber 10 has been placed in position on the well, connecting of the flow lines with the well can be commenced. If desired, the terminal 17 and connectors attached thereto may be connected to the flow lines 18a and pulled across the ocean floor together.

Divers can be lowered from the surface in a diving bell 27 or can dive without such bell. In either case, the chamber 10 is entered through entranceway 26. This entranceway is provided with non-slip tread means 26a as shown in FIG. 2 to facilitate safe entrance into the chamber 10.

The chamber 10 has means 30 for attachment of conduit 30a for communicating with the surface of the ocean and receiving breathable gases for evacuating the water from the chamber. Alternatively, the breathable gases may be pumped through the diving bell 27 and into the chamber 10, via tube 27a.

Before the chamber 10 is entered by the divers, a breathable mixture of gases may be pumped into the chamber 10 through conduit 30a connected to the top of the chamber 10 at connecting means 30. This breathable mixture is forced into the chamber to expel the water therein downwardly and out of the open lower end of the chamber. Such breathable mixture may be forced into the chamber until the water level is near the bottom of the chamber, or even until the water level reaches the bottom and some of the mixture escapes. If the divers are to work in the chamber for extended periods of time it is preferable to continue pumping into the chamber such breathable mixture at a rate which is at least as great as that required to maintain a proper environment for the divers, in which case, the excess mixture and at least some of the stale mixture will be displaced outwardly through the open lower end of the chamber, and will maintain the water level at a location level with the bottom of the chamber. The pressure of the breathable mixture in the chamber will always be substantially equal to the hydrostatic pressure of the ocean at the ocean floor. In any case, the pressure of breathable mixture must always be of sufficient magnitude to depress the water level in the chamber to a level at or near the lower end thereof in order to provide a breathable environment in which the divers can work.

Figure 4:
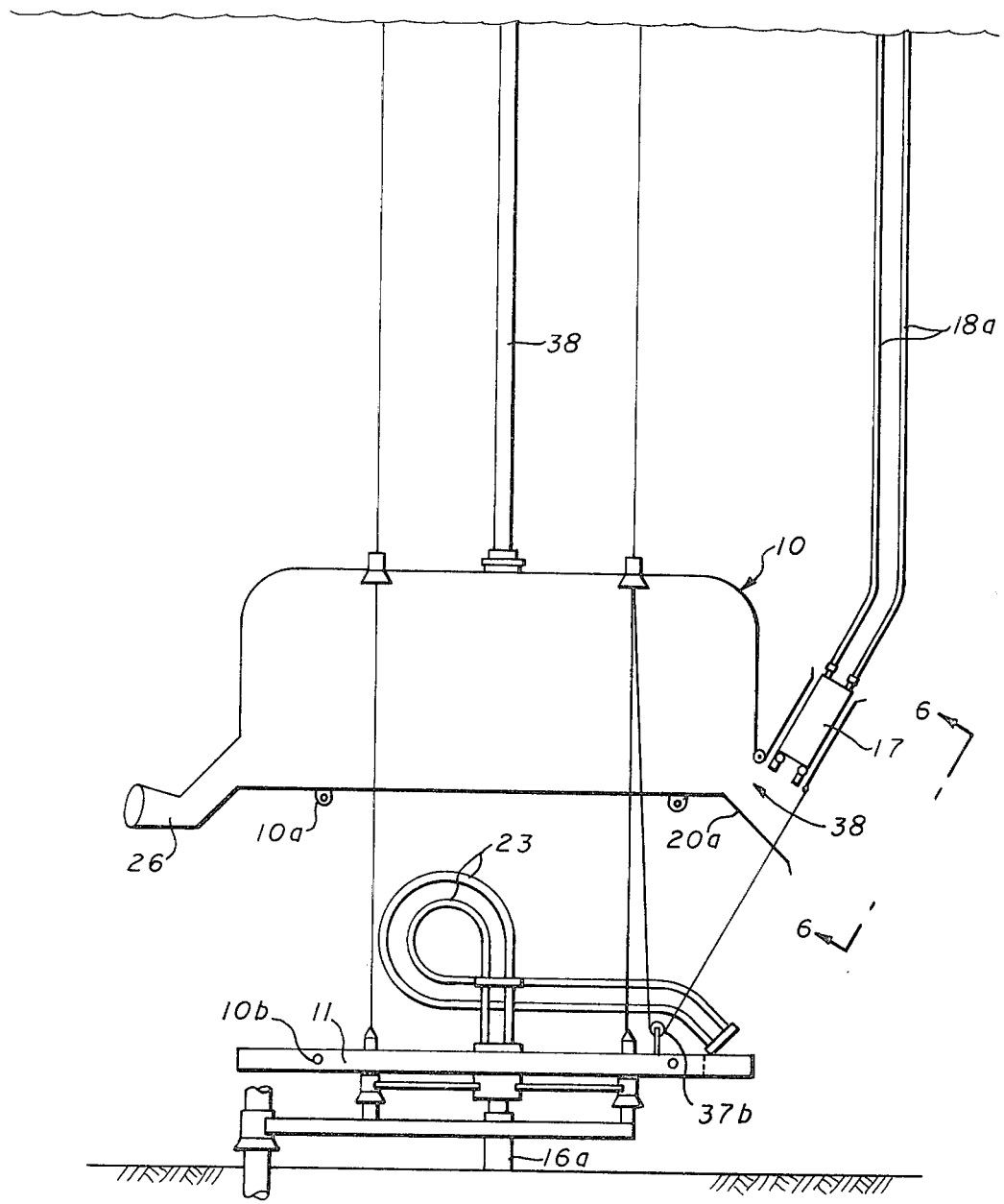
FIG. 4 is a diagrammatic plan, cross-sectional view of the underwater well completion system, showing the flow line loop connected to the well, the work habitat being lowered and with the flow lines connected to and lowered to the well with the habitat.
Figure 6:
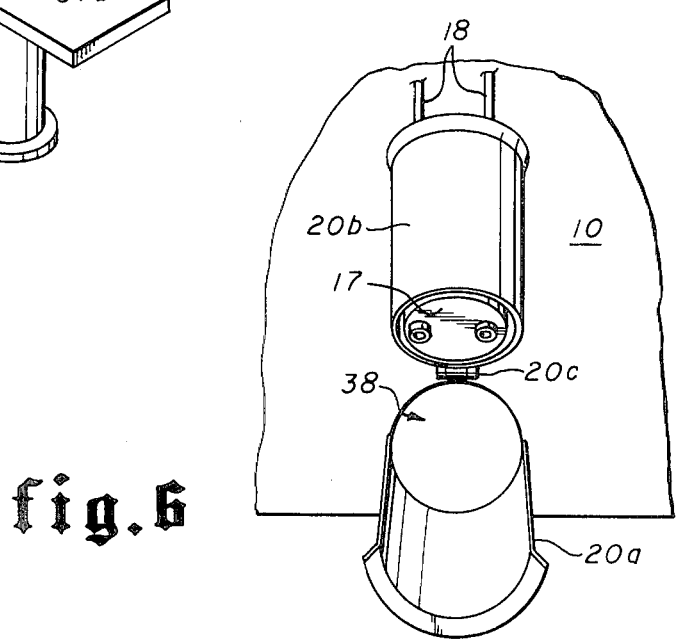
FIG. 6 is a perspective, plan view of the flow line connector secured to the side of the work habitat, as viewed from the perspective of view 6—6 in FIG. 4.

FIGS. 4–6 illustrate an alternate means of carrying the flow line terminal or nose 17 to the well site. As illustrated, the terminal 17 may be carried in a housing 20b, which is hinged to the outer wall of one end of the chamber 10. The hinge 20c allows the housing 20b to be rotated downward to rest in a housing support member 20a when the chamber 10 has been secured to the platform 11. The rotation of the housing 20b and preferably, pulling in of the flow line terminal 17, is done by activating a cable 21a or other means suitable for this purpose. Terminal 17 is thus positioned within opening 38 in the chamber 10 for connection to a flow line loop 23.

In the embodiment of the invention shown in FIG. 4, the flow line loop 23 has been installed prior to placing the chamber 10 on the well platform 11. Alternatively, the loop 23 could be placed on the well along with the chamber 10. On this trip down to the well, the chamber 10 has attached thereon the flow line terminal 17 for connection to the loop 23.

Sufficient flow line may be laid from a surface vessel at this time or later, as required.

Referring to FIG. 2, it is seen where a diving bell 27 would then be lowered to the vicinity of the chamber 10. Saturated divers would then enter the chamber 10 through access 26. If the water therein had not been previously evacuated, they could connect bell 27 to the chamber 10 and fill chamber 10 with a pressurized breathable gas. The pressure would preferably be above atmospheric and substantially equal to hydrostatic ocean pressure.

The diver(s), working in the pressurized breathing environment, can connect the well head 31 to the flow line 18 via the terminal 17 and install all necessary ocean floor manifold valves 24, which have preferably been carried down with the chamber 10.

The divers then operate all valves, downhole and manifold 24, with the use of a portable hydraulic manifold 32 carried down with the rig diving bell 27 and transported to the chamber 10. However, most of the valves, manifolds, connection lines, tools and the like may be carried down within, and attached to, the chamber 10. FIG. 2 illustrates a hoist 25 as one of these work devices that may be carried down to the well structure within the chamber 10.

Upon completion of valve operations and pressure testing of all equipment at the well site, the divers would return to the rig diving bell 27, which is then returned to the surface. The well marker buoy (not shown) would then be floated. The pipe laying barge pulley would return to the buoy marking the end of the flow line and pick up the flow line 18a. The flow line 18a is then laid to the production platform (not shown). Of course, if desired, the flow lines could be laid beforehand from the production platform towards the well system 16.

The underwater chamber 10 may be left pressurized or it can be flooded with sea water. Chamber 10 shown in FIG. 4 could not be removed after flowlines are connected without first disconnecting the chamber 10 from the platform 11. Normally, the chamber 10 is left attached to the platform 11 following its use for completing and testing the well although it may be transferred to another well location and reused there. If, subsequent to its original use, there is need to check the well head, valves, guages or the like, a diving bell can lower saturated divers to the chamber 10 following the same sequence as described above. Workers may therefore visit and work in the chamber 10 as required and make as many trips as may be necessary.

There are, of course, variations in the method and sequence of laying flow lines to or from the well site utilizing the present invention. The advantage of the present system resides in the fact that there is no necessity to provide water tight seals between the chamber and the well structure and the chamber may be constructed of light inexpensive materials as it is not required to withstand higher hydrostatic pressures encountered at extended depths. Thus, it is possible to use saturated divers in a work environment that provides shelter from the currents of the surrounding ocean and a breathable atmosphere which may be replenished. Also, standing upon the deck of the chamber, a diver can apply leverage to the work pieces he is attempting to manipulate.

What is claimed is:

1. An underwater well completion system comprising:
   an independently transportable chamber, having a lower open section, lowerable from the surface and adapted to rest upon an underwater well structure;
   means for securing said chamber to said well structure in non-sealing relation;
   means on said chamber to communicate with the surface for evacuating sea water from the inside of said chamber;
   said chamber being constructed of materials which will withstand impinging forces of underwater currents and a pressure differential equal to the height of the chamber times the hydrostatic pressure gradient of ocean water,
   a pivotally mounted housing on said chamber for receiving a flow line terminal,
   a housing support on said chamber to support and guide the housing,
   an opening in said chamber associated with said housing support to receive said housing upon its pivoting to a position to rest on said housing support.

2. The underwater well completion system of claim 1, including releasable connecting means for connecting said chamber to said underwater well structure.

3. The underwater well completion system of claim 1, wherein said chamber has disposed therein well completion means that are carried with said chamber upon its being lowered to said underwater well structure.

4. The underwater well completion system of claim 1, wherein there is included a flow line terminal received in said housing, whereby said flow line terminal may accompany said chamber when said chamber is lowered to said underwater well structure.

5. The underwater well completion system of claim 4, including flow lines connected to said flow line terminal.

6. The underwater well completion system of claim 4, including means within said chamber to draw said flow line terminal into said chamber for connection of said flow line terminal to a well connection received within said chamber.

* * * * *